(12) United States Patent
Ortiz et al.

(10) Patent No.: US 11,791,628 B2
(45) Date of Patent: Oct. 17, 2023

(54) SST SYSTEM WITH MULTIPLE LVDC OUTPUTS

(71) Applicant: Hitachi Energy Switzerland AG, Baden (CH)

(72) Inventors: Gabriel Ignacio Ortiz, Schlieren (CH); Stephane Isler, Faucigny (FR); Juergen Steinke, Albbruck (DE); Francisco Canales, Baden-Dättwil (CH)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/916,473

(22) PCT Filed: Mar. 30, 2021

(86) PCT No.: PCT/EP2021/058322
§ 371 (c)(1),
(2) Date: Sep. 30, 2022

(87) PCT Pub. No.: WO2021/198270
PCT Pub. Date: Oct. 7, 2021

(65) Prior Publication Data
US 2023/0178982 A1    Jun. 8, 2023

(30) Foreign Application Priority Data
Mar. 30, 2020    (EP) ..................................... 20166634

(51) Int. Cl.
*H02J 1/12*        (2006.01)
*H02J 1/08*        (2006.01)
(Continued)

(52) U.S. Cl.
CPC ................ *H02J 1/12* (2013.01); *H02J 1/082* (2020.01); *H02J 1/106* (2020.01); *H02M 3/01* (2021.05)

(58) Field of Classification Search
CPC .. H02J 1/12; H02J 1/082; H02J 1/106; H02M 3/01
See application file for complete search history.

(56) References Cited

U.S. PATENT DOCUMENTS

| | | | |
|---|---|---|---|
| 2008/0174177 A1 | 7/2008 | Anglois et al. | |
| 2013/0134935 A1 | 5/2013 | Maitra et al. | |

(Continued)

FOREIGN PATENT DOCUMENTS

| | | |
|---|---|---|
| AU | 2016200827 A1 | 8/2017 |
| CN | 103516230 A | 1/2014 |

(Continued)

OTHER PUBLICATIONS

Achanta, P., et al., "Cascaded Quadruple Active Bridge Structures for Multilevel DC to Three-phase AC Conversion", 2018 IEEE Applied Power Electronics Conference and Exposition, San Antonio, TX, USA, Mar. 4-8, 2018, pp. 156-160.

(Continued)

*Primary Examiner* — Daniel Cavallari
(74) *Attorney, Agent, or Firm* — Slater Matsil, LLP

(57) ABSTRACT

An electrical interconnection circuit can be used with a solid-state-transformer (SST) system. The interconnection circuit includes medium voltage direct current (MVDC) to low voltage direct current (LVDC) direct current to direct current (DC/DC) converters, independent LVDC buses respectively connected to one of the MVDC to LVDC DC/DC converters, and an interconnecting DC/DC converter connecting at least two of the independent LVDC buses in order to ensure equal power demand from each (Continued)

MVDC to LVDC DC/DC converters. The interconnecting DC/DC converter is configured to re-route power between the plurality of independent LVDC buses. A power rating of the interconnecting DC/DC converter is set according to power to be rerouted from other LVDC buses via the interconnecting DC/DC converter.

20 Claims, 2 Drawing Sheets

(51) Int. Cl.
*H02J 1/10* (2006.01)
*H02M 3/00* (2006.01)

(56) References Cited

U.S. PATENT DOCUMENTS

| | | | |
|---|---|---|---|
| 2018/0102646 | A1 | 4/2018 | Apte et al. |
| 2020/0001730 | A1 | 1/2020 | Gohla-Neudecker et al. |
| 2021/0167597 | A1* | 6/2021 | Gritsch .......... H02J 1/102 |
| 2021/0172382 | A1* | 6/2021 | Bruce .......... F01D 15/10 |

FOREIGN PATENT DOCUMENTS

| | | | |
|---|---|---|---|
| CN | 103795132 | A | 5/2014 |
| CN | 104868762 | A | 8/2015 |
| DE | 102013225230 | A1 | 6/2015 |
| EP | 33390084 | A1 | 6/2018 |
| FR | 3078029 | A1 | 8/2019 |
| JP | 2013005677 | A | 1/2013 |
| JP | 2013183588 | A | 9/2013 |
| JP | 2015171307 | A | 9/2015 |
| WO | 2014041192 | A1 | 3/2014 |
| WO | 2016073893 | A1 | 5/2016 |
| WO | 2018208991 | A1 | 11/2018 |

OTHER PUBLICATIONS

Dragicevic, T., et al., "DC Microgrids—Part II: A Review of Power Architectures, Applications, and Standardization Issues", IEEE Transactions on Power Electronics, vol. 31, No. 5, May 2016, pp. 3528-3549.

Yang, Y., et al., "Architecture Design and Evaluation of Hybrid AC/DC Power Grids Based on Power Electronic Transformer", 2019 IEEE PES Innovative Smart Grid Technologies Asia, Chengdu, China, May 21-24, 2019, pp. 2196-2200.

Bignucolo, F., et al., "Interconnecting Neighbors' Buildings: Advantages of Energy Districts Realized Through Private DC Lines," 2018 IEEE International Conference on Environment and Electrical Engineering and 2018 IEEE Industrial and Commercial Power Systems Europe (EEEIC / I&CPS Europe), Jun. 12, 2018, 5 pages.

Neumayr, D., et al., "P3DCT—Partial-Power Pre-Regulated DC Transformer," IEEE Transactions on Industrial Electronics, vol. 34, Issue 7, Jul. 2019, 13 pages.

European Patent Office, Communication pursuant to Article 94(3) EPC, dated Aug. 14, 2023, 9 pages.

* cited by examiner

SST SYSTEM WITH MULTIPLE LVDC OUTPUTS

CROSS-REFERENCE TO RELATED APPLICATIONS

This application is a national stage application of International Application No. PCT/EP2021/054736, filed on Feb. 25, 2021, which claims priority to European Patent Application No. 20167310.0, filed on Mar. 1, 2020, which applications are hereby incorporated herein by reference.

TECHNICAL FIELD

The invention relates to a solid-state-transformer (SST) system with multiple low voltage direct current outputs.

BACKGROUND

EP 3 339 084 A1 relates to an electric vehicle charging station comprising a transformer. The transformer is a multi-winding transformer comprising one primary winding and a plurality of secondary windings. The secondary windings are electrically isolated from one another. The electric vehicle charging station further comprises an AC/DC converter to which a secondary winding is connected.

AU 2016/200827 A1 relates to a series of circuit topologies for AC-to-AC and AC-to-DC power transferring through solid-state-transformer (SST) and their control methods. By having passive filters and reactive power compensator, such SST can operate at high frequency close to several hundred kilohertz even higher. A multi-stage AC/DC converter is adopted to interface SST with high voltage AC grid, from which power is supplied or exchanged. A first system based on the developed SST is adopted to transfer power between two AC grids. A second system based on the developed SST is used to charge battery or power DC load or DC microgrid from AC grid. A third system based on the developed SST is used to supply power to multiple loads, including AC grid, DC load, charging battery, and powering DC microgrid. Furthermore, the document relates to a bi-directional AC/DC or AC/AC systems based on the developed SST.

Achanta, P. et al. "Cascaded quadruple active bridge structures for multilevel DC to three-phase AC conversion", IEEE Applied Power Electronics Conference and Exposition (APEC), San Antonio, Tex., USA, 4-8 Mar. 2018, relates to a multilevel architecture comprised of interconnected dc to three-phase ac converter units. To enable series connected operation, each converter unit contains a quadruple active bridge (QAB) converter that provides isolation between the dc side and each of the three ac sides. Since each converter unit transfers dc-side power as constant balanced three-phase power on the ac side, this implies instantaneous input-output power balance and allows elimination of bulk capacitive energy storage. In addition to minimizing required capacitance, the proposed approach simultaneously enables simplified dc-link controllers amenable to decentralized implementation, supports bidirectional power transfer, and exhibits a modular structure to enhance scalability. Isolation provided by the QAB allows a wide range of electrical configurations among multiple units in various dc-ac, ac-dc or ac-ac applications. In this paper, the focus is on series connections on the ac side to emphasize multilevel operation, and the approach is experimentally validated in a dc-ac system containing two cascaded converter units.

Architecture Design and Evaluation of Hybrid AC/DC Power Grids Based on Power Electronic Transformer", 2019 IEEE INNOVATIVE SMART GRID TECHNOLOGIES—ASIA (ISGT ASIA), IEEE, pages 2196-2200 Chapters II and III, shows in FIG. 3(b) and describes in section B an electrical interconnection circuit for an SST system. The inter-connection circuit comprises a plurality of MVAC/LVDC AC/DC converters. The DC buses each are connected by a DC/DC converter and a DC circuit breaker.

US 2008/0174177 A1 describes a system and method for supplying power for actuators on board aircraft. For an aircraft, redundant components must be provided for safety reasons.

SUMMARY

The invention relates to an electrical interconnection circuit, for a solid-state-transformer (SST) system with at least two independent low voltage direct current (LVDC) buses. The invention also relates to an electrical interconnection circuit, for a solid-state-transformer (SST) system with at least one independent low voltage direct current (LVDC) bus and at least one interconnecting DC/DC converter, which is configured to ensure that a plurality of MVDC to LVDC DC/DC converters share the same load. The invention also relates to a solid-state-transformer (SST) system for transforming medium voltage alternating current (MVAC) to low voltage direct current (LVDC).

Embodiments of the invention provide an improved SST system. In particular embodiments, the number of conversion stages of the SST can be reduced while keeping an input voltage equalization for each MVDC to LVDC connecting DC/DC converter.

In one embodiment, an electrical interconnection circuit for a solid-state-transformer (SST) system comprises a plurality of medium voltage direct current (MVDC) to low voltage direct current (LVDC) direct current to direct current (DC/DC) converters, at least two independent low voltage direct current (LVDC) buses, and at least one interconnecting DC/DC converter connecting the at least two independent LVDC buses.

Further embodiments and advantages of the method are directly and unambiguously derived by the person skilled in the art from the system as described herein.

BRIEF DESCRIPTION OF THE DRAWINGS

These and other aspects of the invention will be apparent from and elucidated with reference to the embodiments described hereinafter.

In the drawings.

DETAILED DESCRIPTION OF ILLUSTRATIVE EMBODIMENTS

Figure 1:
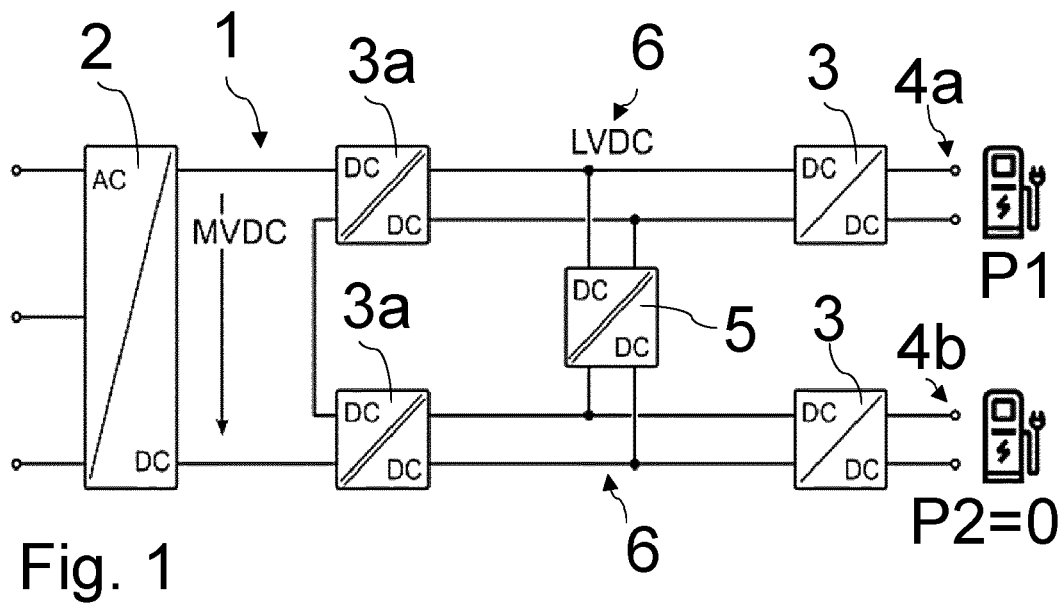
FIG. 1 schematically shows a solid-state-transformer system according to an embodiment.

In a first embodiment, an electrical interconnection circuit for an SST system 1, the interconnection circuit comprises a plurality of medium voltage direct current (MVDC) to low voltage direct current (LVDC) direct current to direct current (DC/DC) converters (3a, 3b), at least two independent low voltage direct current (LVDC) buses 6, and at least one interconnecting DC/DC converter 5 connecting the at least two independent LVDC buses 6. The at least one interconnecting DC/DC converter 5 is configured to re-route power between the at least two independent LVDC buses 6. A power rating of the at least one interconnecting DC/DC converter 5 is set according to power to be rerouted from other LVDC buses 6 via the at least one interconnecting DC/DC converter 5.

Additionally, the interconnecting circuit may comprise features according to any of the embodiments discussed below.

A solid-state-transformer (SST) system 1 can be used for transforming medium voltage alternating current (MVAC) to low voltage direct current (LVDC). The SST system 1 comprises MVAC transforming means, configured to transform MVAC to MVDC and at least one interconnection circuit. The interconnection circuit may be configured according to any of the embodiments.

A solid-state-transformer is a power electronic converter with medium voltage input, low voltage output and integrated medium frequency isolation. Such transformers are suitable for power transfer from the medium-voltage grid to the low-voltage grid. A reversal of the power flow, i.e., a bidirectional power transfer, is conceivable. Furthermore, it should be noted that operation is not restricted to AC networks, but that there may be a DC connection on the input and/or output side or operation on both sides of the AC or DC medium voltage network. SSTs thus combine elements of rectifier (AC/DC), inverter (DC/AC) and potential-separated DC/DC converter circuits as well as converter structures with multi-stage energy conversion or matrix converters and are finally designed in multi-level topology or in multi-cell structure to control the medium voltage. A solid state transformer is also called "smart transformer" or "power electronics transformer."

It is a key point of the invention, in order to reduce the number of conversion stages of the SST, to propose a solution where multiple LVDC outputs, corresponding to the LVDC buses 6, are formed. In an electrical vehicle (EV) charging case, for example, each of these LVDC outputs would, for instance, correspond to a charging pole. In case of battery energy storage systems (BESS) or for solar applications, they would correspond to, for example, to a group of battery packs or a cluster of solar panels respectively.

In order to guarantee a required input voltage equalization for each MVDC to LVDC connecting DC/DC converter 3 in case that each LVDC output demands unequal amounts of power from their respective LVDC buses 6, an interconnecting DC/DC converter 5 is provided between the independent LVDC buses 6. This converter can re-route the power between LVDC buses 6 in order to ensure equal power demand from each MVDC to LVDC DC/DC converter 3. In the EV charging case, this concept results in that prior known car-to-car insulating DC/DC converters are replaced by a single DC/DC isolated converter 5 of a reduced amount of power. Thus, a total amount of conversion stages is effectively reduced. Similarly, in the BESS case, this concept results in the reduction of the total amount of installed power of the system.

According to a preferred embodiment, one single interconnecting DC/DC converter 5 connects two of the at least two independent LVDC buses 6 to the plurality of MVDC to LVDC DC/DC converters 3. A paired connection of two LVDC buses 6 through a DC/DC converter can reduce the power rating of the DC/DC converter when designing the electrical circuit. Also, a less complex circuit can be provided in this way. Thus, depending on the application, it is a more cost-effective concept to manufacture.

According to a preferred embodiment, the at least one interconnecting DC/DC converter 5 is configured such that each of the plurality of MVDC to LVDC DC/DC converters 3 is under same load. Such a configuration of the DC/DC converter 3 is advantageous, for example, if very different powers have to be fed out at the independent LVDC outputs.

According to a preferred embodiment, a power of the at least one interconnecting DC/DC converter 5 is set according to a power to be rerouted from other LVDC buses 6 via the at least one interconnecting DC/DC converter 5. In other words, a power of the interconnecting DC/DC converter 5 is deliberately designed to transmit the power of other DC/DC converters. An even load of the components is therefore advantageously guaranteed. In the context of this preferred embodiment, two scenarios are described.

There should be considered a simplified SST system 1 with an accordingly simplified interconnection circuit with two LVDC buses 6 in the electric vehicle charging case. In such a case, it can occur that one of the charging poles, corresponding to one of the LVDC buses 6, demands a total power P1 and the second pole, corresponding to another of the LVDC buses 6, demands no power. In this case, the power from each MVDC to LVDC DC/DC converter 3 must be equal to P1/2 in order to ensure equal input voltage for each of the MVDC connected cells. In this worst-case scenario, the interconnecting DC/DC converter 5 must reroute a total power of P1/2 from the unloaded LVDC bus 6 to the fully loaded LVDC bus 6. Therefore, the rating of this DC/DC converter is equal to half of the rated power of each charging pole.

There should also be considered a simplified SST system 1 with an accordingly simplified interconnection circuit with two LVDC buses 6 in the BESS/solar case. In such a case, the differences in the output power per LVDC outputs are expected to be considerably lower than in the EV charging case. For this reason, a more general formulation for the dimensioning of the interconnecting DC/DC converter 5 is considered. In this case, the power rating of the interconnecting DC/DC converter 5 is equal to (P1−P2)/2 while P1−P2 represents a worst-case difference of power between the two LVDC outputs and is always lower or equal than the total power of a single LVDC output. In this sense, given the comparatively small differences expected between state of charge of independent battery packs in the BESS case or power supplied by clusters of PV panels in the solar case, the rating of this interconnecting DC/DC converter 5 is a small portion of the total power per LVDC output.

According to a preferred embodiment, a power of the at least one interconnecting DC/DC converter 5 is set according to an output power of one of the at least two LVDC buses 6 under full load. According to a preferred embodiment, no power is provided by other LVDC buses 6. If the interconnecting circuit is designed for this worst-case scenario, it can be advantageously used for other, less extreme scenarios in which several LVDC buses 6 are under load and have to deliver power.

According to a preferred embodiment, for each pair of connected LVDC buses 6, a power of the at least one interconnecting DC/DC converter 5 is set to (P1−P2)/2, wherein P1 is a power corresponding to a load on one of the two LVDC buses 6, and wherein P2 is a power corresponding to a load on another of the two LVDC buses 6. This rule can also be used to set power ratings for DC/DC converters, where different loads are applied to the LVDC buses 6. The embodiment described above can be extended to any number of LVDC buses 6 connected in pairs. Thus, a simple design of the interconnection circuit is possible.

According to a preferred embodiment, each of the LVDC buses 6 is connected to each of the LVDC buses 6 via one interconnecting DC/DC converter 5, wherein a power rating of each of the interconnecting DC/DC converters 5 is P/n, wherein n is a number of LVDC buses 6 of the interconnection circuit. This particularly allows a simple design of the circuit with advantage in case of two or three LVDC buses 6.

According to a preferred embodiment, in each connection between the LVDC bus 6 and the interconnecting DC/DC converter 5 another DC/DC converter is connected in series. In the case of electrical vehicle charging, the requirement for isolation between the individual cars, each of which is connected to an LVDC bus 6, can be met.

According to a preferred embodiment, the interconnecting DC/DC converter 5 is one of a bidirectional converter or a bidirectional buck-boost converter or a dual-active bridge (DAB) or a regulated resonant converter. These are components that can be manufactured at low cost and are readily available, which in turn enable the interconnection circuit to be manufactured at low cost.

According to a preferred embodiment, each MVDC to LVDC DC/DC converters 3 is one of an unregulated resonant converter or a DAB or a regulated resonant converter. These are components that can be manufactured at low cost and are readily available, which in turn enable the interconnection circuit to be manufactured at low cost.

Referring now to FIG. 1 a solid-state-transformer (SST) system 1 according to an embodiment is schematically shown. The SST system 1 is shown in a very simplified version. The SST system 1 is appropriate for electrical vehicle (EV) charging applications. In this system, power from medium voltage alternating current (MVAC) to each of the charging poles 4a, 4b is effectively processed by a total of three stages. In this case, all insulated DC/DC converters can be of the unregulated/series-resonant type, whereby a final battery charger is a non-insulated buck converter.

The SST system 1 is connected to a medium voltage alternating current (MVAC) grid via an AC/DC converter 2. The SST system 1 comprises the AC/DC-converter 2 being configured to operate in a medium voltage direct current (MVDC) mode. The SST system 1 further comprises two pairs of DC/DC converters 3, 3a, wherein each pair comprises two DC/DC converters 3, 3a, which are connected in series. The DC/DC converters 3, 3a connected in series are connected to a charging pole 4a, 4b. Each of the charging poles 4a, 4b can be used for charging a vehicle (not shown).

The pairs of DC/DC converters 3, 3a are connected in parallel via a single DC/DC isolated converter 5 of a reduced amount of power. The DC/DC isolated converter 5 is an interconnecting converter. The SST system 1 comprises two independent low voltage direct current (LVDC) buses 6 with corresponding LVDC outputs. Each of these LVDC outputs corresponds to one of the two charging poles 4a, 4b. The DC/DC converters 3a are MVDC to LVDC DC/DC converters being configured to convert MVDC into LVDC. The DC/DC isolated converter 5 is isolated due to the other DC/DC converters 3. The other DC/DC converter 3 of the series is required due to the insulation requirement for electrical vehicle charging. In other words, the DC/DC converter 3 has the function of insulating between the two charging poles 4.

The reduced amount of power of the single DC/DC isolated converter 5 is deduced as follows for this SST system 1.

In the embodiment, the scenario is assumed that a first charging pole 4a is occupied and a power P1 is required. A second charging pole 4b is not used for charging. Consequently, power P2=0 is required at this charging pole 4b. The power from each of the converters 3a is equal to P1/2 in order to ensure equal input voltage for each of MVDC connected cells. In this worst-case scenario, the interconnecting DC/DC converter 5 must reroute a total power of P1/2 from an unloaded LVDC bus 6 to a fully loaded LVDC bus 6. Therefore, a rating of this DC/DC converter 3a is equal to half of the rated power P1, P2 of each charging pole 4a, 4b.

Furthermore, the interconnecting DC/DC converter 5 is full bidirectional and regulated type, given that power flow is expected in both directions and to ensure equal power provided by each MVDC to LVDC DC/DC converter 3a.

Figure 2:
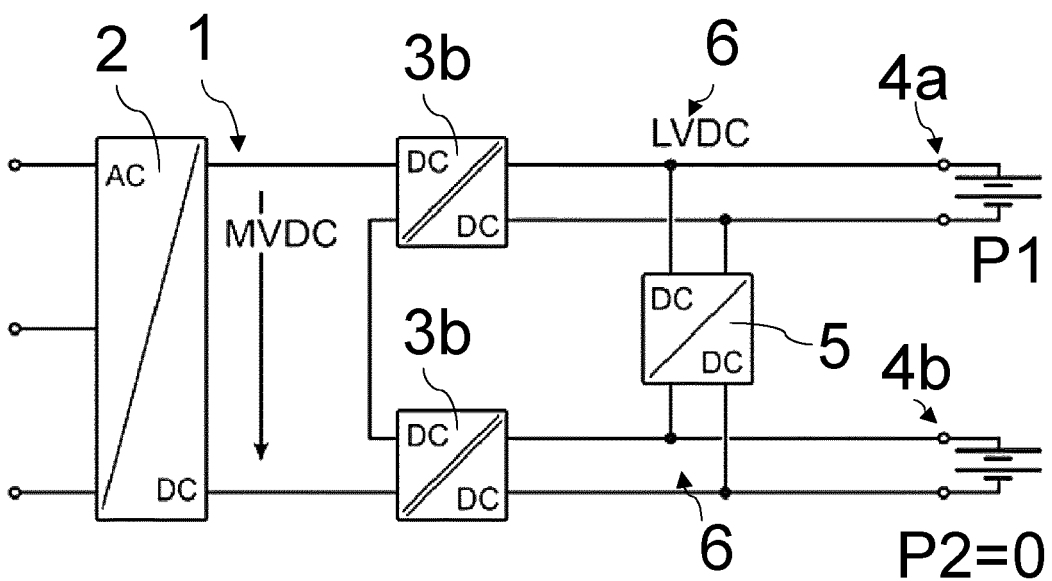
FIG. 2 schematically shows a solid-state-transformer system according to another embodiment.

FIG. 2 schematically shows a solid-state-transformer system 1 according to another embodiment. The SST system 1 is appropriate for battery energy storage systems (BESS) or solar energy systems. In the previously described system, power from MVAC to the battery is processed by three stages.

The SST system 1 comprises an AC/DC-converter 2 being configured to operate in a MVDC mode. The SST system 1 further comprises two DC/DC converters 3b. The DC/DC converters 3b are connected to a charging pole 4a, 4b. Each of the charging poles 4a, 4b can be used to charge a group of battery packs or be supplied by a cluster of solar panels. The DC/DC converters 3b are connected in parallel via a single DC/DC isolated converter 5 of a reduced amount of power. The DC/DC isolated converter 5 is an interconnecting converter. The SST system 1 comprises two independent low voltage direct current (LVDC) buses 6 with corresponding LVDC outputs. Each of these LVDC outputs corresponds to one of the two charging poles 4a, 4b, each supplying a group of battery packs or being supplied by a cluster of solar panels respectively. The DC/DC converters 3b are configured to convert MVDC into LVDC.

The reduced amount of power of the single DC/DC isolated converter 5 is deduced as follows for this SST system 1.

In the BESS/solar case, the differences in the output power per LVDC outputs are lower than in the EV charging case. For this reason, a more general formulation for the dimensioning of the interconnecting DC/DC converter is considered. In this case, the power rating of the interconnecting DC/DC converter 5 is equal to (P1−P2)/2 while P1−P2 represents a worst-case difference of power between the two LVDC outputs. The worst-case difference of power is lower or equal than the total power of a single LVDC output. In this sense, given the comparatively small differences expected between state of charge of independent battery packs in the BESS case or power supplied by clusters of PV panels in the solar case, the rating of this interconnecting DC/DC converter 5 is only a small portion of the total power per LVDC output.

In the case of BESS/solar applications, an unregulated resonant converter (used as a DC/DC converter 3a in the first embodiment) must be exchanged by a regulated resonant converter or a Dual-Active-Bridge (DAB), given that each LVDC output must provide regulation to its independent battery pack or solar panel for proper charging or discharging in the BESS case or for implementing maximum power point tracking (MPPT) for each photovoltaic (PV) panel cluster in the solar case. Furthermore, the interconnecting DC/DC converter must be of the bidirectional buck boost type in order to cover all possible cases.

Figure 3:
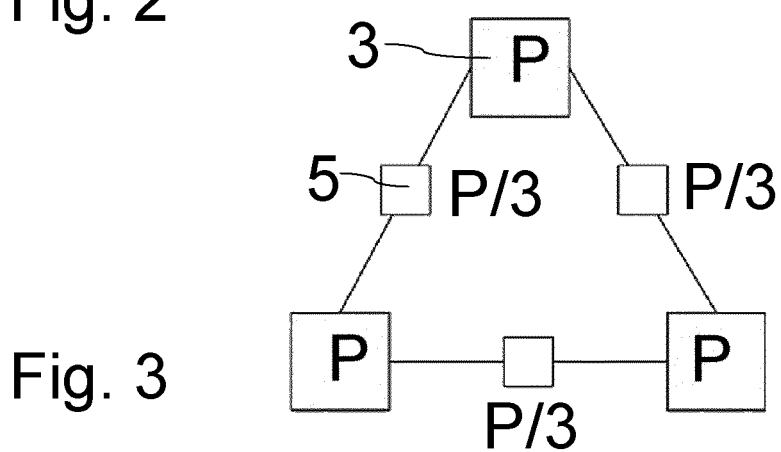
FIG. 3 schematically shows a power rating scheme of isolating DC/DC-converters and interconnecting converters for three LVDC outputs according to an embodiment, for a solid-state-transformer system.

FIG. 3 schematically shows a power rating of isolating DC/DC-converters 3 and interconnecting converters 5 for three LVDC outputs according to an embodiment, for a solid-state-transformer system 1. The FIG. 3 corresponds to a ring configuration with three interconnecting DC/DC converters 5 and three isolating DC converters 3. The scheme in the Figure shows, in a simplified way, required power ratings when extending the concept of power rating to three LVDC outputs and considering a worst-case of load asymmetry, i.e. full load in only one LVDC output and zero in all others. Accordingly, powers of the interconnecting DC/DC converters 5 are each rated by a third of the power P of one LVDC output.

Figures 4, 5:
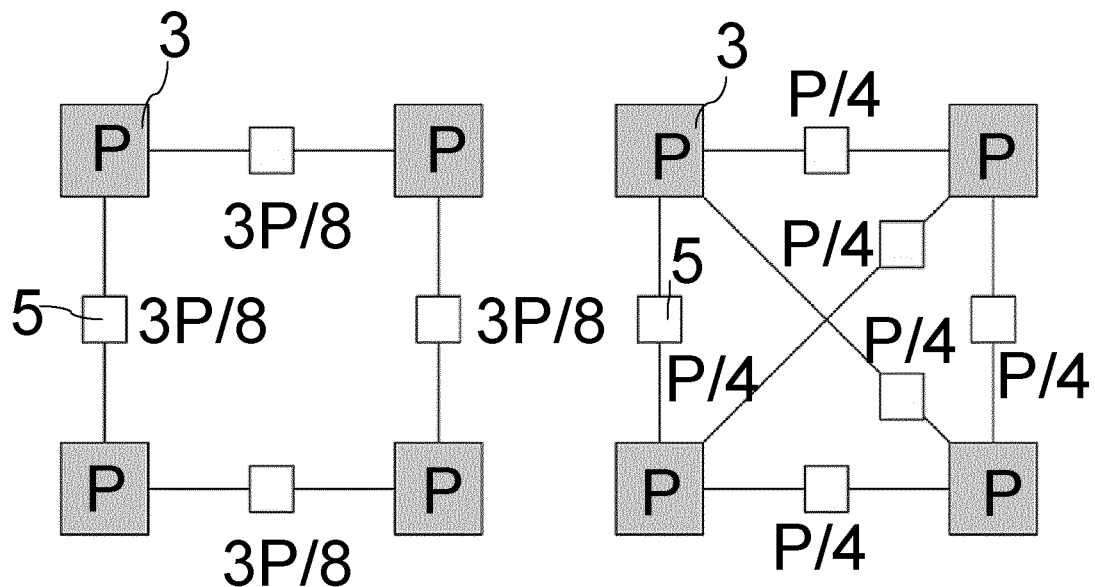
FIG. 4 schematically shows a power rating scheme of isolating DC/DC-converters and interconnecting converters for four LVDC outputs according to an embodiment, for a solid-state-transformer system.
FIG. 5 schematically shows a power rating scheme of isolating DC/DC-converters and interconnecting converters for four LVDC outputs according to another embodiment, for a solid-state-transformer system.

FIG. 4 schematically shows a power rating of isolating DC/DC-converters 3 and interconnecting converters 5 for four LVDC outputs according to an embodiment, for a solid-state-transformer system 1. The FIG. 4 corresponds to a ring configuration with four interconnecting DC/DC converters 5 and four isolating DC converters 3. The scheme in the Figure shows, in a simplified way, required power ratings when extending the concept of power rating to four LVDC outputs and considering the worst-case of load asymmetry with full load in only one LVDC output and zero in all others. Accordingly, the powers of the interconnecting DC/DC converters 5 are each rated by ⅜ of the power P of one LVDC output.

FIG. 5 schematically shows a power rating of isolating DC/DC-converters 3 and interconnecting converters 5 for four LVDC outputs according to an embodiment, for a solid-state-transformer system 1. The FIG. 5 corresponds to a configuration with six interconnecting DC/DC converters 5 and four isolating DC converters 3. All isolating DC converters 3 being further connected to an LVDC bus 6 (not shown in the Figure) are interconnected with each other. The scheme in the Figure shows, in a simplified way, required power ratings when extending the concept of power rating to four LVDC outputs and considering the worst-case of load asymmetry with full load in only one LVDC output and zero in all others. Accordingly, the powers of the interconnecting DC/DC converters 5 are each rated by a quarter of the power P of one LVDC output.

The interconnecting DC/DC converters 5 can be combined in other ways which enhance certain functionalities of the system.

Figures 6, 7:
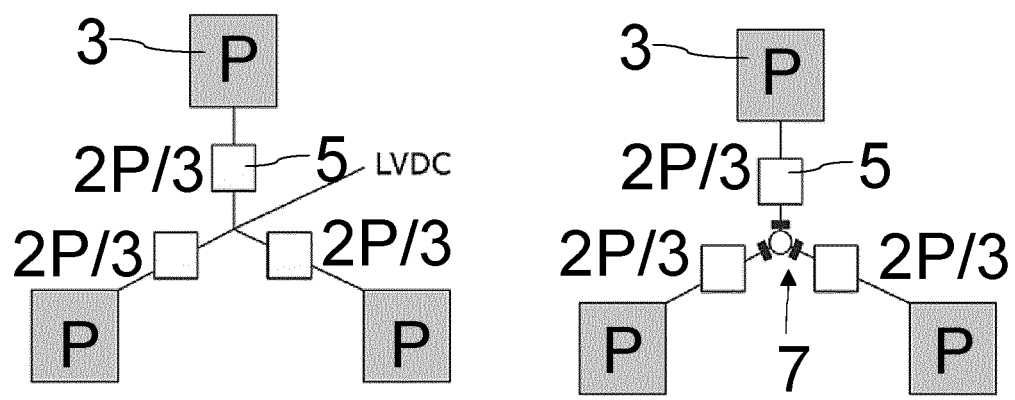
FIG. 6 schematically shows a power rating scheme of isolating DC/DC-converters and interconnecting converters with a common LVDC bus according to an embodiment, for a solid-state-transformer system.
FIG. 7 schematically shows a power rating scheme of isolating DC/DC-converters and interconnecting converters with an interconnection via magnetic coupling according to an embodiment, for a solid-state-transformer system.

FIG. 6, for example, schematically shows a power rating of isolating DC/DC-converters 3 and interconnecting converters 5 for one LVDC bus 6 according to an embodiment, for a solid-state-transformer system 1. The FIG. 6 is a configuration with three interconnecting DC/DC converters 5 and three isolating DC converters 3. The scheme in the Figure shows, in a simplified way, required power ratings when extending the concept of power rating to four LVDC outputs and considering the worst-case of load asymmetry with full load in only one LVDC output. Accordingly, the powers of the interconnecting DC/DC converters 5 are each rated by two-thirds of the power P of the one LVDC output. The previously described embodiment can be used to, for example, integrate renewable sources and/or to interface to a common battery storage unit.

FIG. 7 shows a similar power rating concept for a similar configuration as the embodiment according to FIG. 6. This configuration comprises one common interconnection between the DC/DC converters 3 and the interconnecting converters 5 via one interconnecting magnetic coupling 7. In other words, a DC interconnection is replaced by a medium frequency AC interconnection, realized by means of a multi-winding medium frequency transformer replacing the individual MFTs. Each winding is connected to a respective power electronics bridge, thus avoiding the secondary AC/DC stages. The advantage in this configuration is that each interconnecting converter requires only half the number of the power semiconductor devices.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST

1 solid-state-transformer (SST) system
2 AC/DC converter
3 DC/DC converter for insulation
3a DC/DC converter configured to convert MVDC into LVDC
3b DC/DC converter of second embodiment
4a first charging pole
4b second charging pole
5 DC/DC isolated converter
6 LVDC bus
7 interconnecting magnetic coupling
P1 power from first charging pole
P2 power from second charging pole

The invention claimed is:
1. An electrical interconnection circuit for a solid-state-transformer (SST) system, the interconnection circuit comprising:
 a plurality of medium voltage direct current (MVDC) to low voltage direct current (LVDC) direct current to direct current (DC/DC) converters;
 a plurality of independent LVDC buses respectively connected to one of the MVDC to LVDC DC/DC converters; and at least one interconnecting DC/DC converter connecting at least two of the independent LVDC buses in order to ensure equal power demand from each MVDC to LVDC DC/DC converters;

wherein the at least one interconnecting DC/DC converter is configured to re-route power between the plurality of independent LVDC buses; and wherein a power rating of the at least one interconnecting DC/DC converter is set according to power to be rerouted from other LVDC buses via the interconnecting DC/DC converter.

2. The interconnection circuit according to claim 1, wherein one single interconnecting DC/DC converter connects two of the at least two independent LVDC buses to the plurality of MVDC to LVDC DC/DC converters.

3. The interconnection circuit according to claim 1, wherein a power of the at least one interconnecting DC/DC converter is set according to an output power of one of the LVDC buses under full load.

4. The interconnection circuit according to claim 1, wherein no power is provided by other LVDC buses.

5. The interconnection circuit according to claim 1, wherein for each pair of connected LVDC buses, a power of the at least one interconnecting DC/DC converter is set to (P1−P2)/2, wherein P1 is a power corresponding to a load on one of the two LVDC buses, and wherein P2 is a power corresponding to a load on another of the two LVDC buses.

6. The interconnection circuit according to claim 1, wherein each of the LVDC buses is connected to each of the LVDC buses via one interconnecting DC/DC converter, wherein a power rating of each of the interconnecting DC/DC converters is P/n, and wherein n is a number of LVDC buses of the interconnection circuit.

7. The interconnection circuit according to claim 1, wherein another DC/DC converter is connected in series in each connection between the LVDC bus and the interconnecting DC/DC converter.

8. The interconnection circuit according to claim 1, wherein each interconnecting DC/DC converter is one of a bidirectional converter or a bidirectional buck-boost converter or a dual-active bridge or a regulated resonant converter.

9. The interconnection circuit according to claim 1, wherein each MVDC to LVDC DC/DC converters is one of an unregulated resonant converter or a dual-active bridge or a regulated resonant converter.

10. A solid-state-transformer (SST) system for transforming medium voltage alternating current (MVAC) to low voltage direct current (LVDC) comprising:
MVAC transforming means, configured to transform MVAC to MVDC; and
at least one interconnection circuit according to claim 1 coupled to the MVAC transforming means.

11. An electrical interconnection circuit for a solid-state-transformer (SST) system, the interconnection circuit comprising:
a plurality of medium voltage direct current (MVDC) to low voltage direct current (LVDC) direct current to direct current (DC/DC) converters, wherein each MVDC to LVDC DC/DC converters is one of an unregulated resonant converter or a dual-active bridge or a regulated resonant converter;
a plurality of independent LVDC buses respectively connected to one of the MVDC to LVDC DC/DC converters, wherein each interconnecting DC/DC converter is one of a bidirectional converter or a bidirectional buck-boost converter or a dual-active bridge or a regulated resonant converter;
at least one interconnecting DC/DC converter connecting at least two of the independent LVDC buses in order to ensure equal power demand from each MVDC to LVDC DC/DC converters;
wherein the at least one interconnecting DC/DC converter is configured to re-route power between the plurality of independent LVDC buses;
wherein a power rating of the at least one interconnecting DC/DC converter is set according to power to be rerouted from other LVDC buses via the interconnecting DC/DC converter;
wherein each of the LVDC buses is connected to each of the LVDC buses via one interconnecting DC/DC converter, wherein a power rating of each of the interconnecting DC/DC converters is P/n, and wherein n is a number of LVDC buses of the interconnection circuit.

12. A solid-state-transformer (SST) system for transforming medium voltage alternating current (MVAC) to low voltage direct current (LVDC), the SST system comprising:
an MVAC transformer configured to transform MVAC to MVDC;
a plurality of medium voltage direct current (MVDC) to low voltage direct current (LVDC) direct current to direct current (DC/DC) converters coupled to the MVAC transformer;
a plurality of independent LVDC buses respectively connected to one of the MVDC to LVDC DC/DC converters; and
at least one interconnecting DC/DC converter connecting at least two of the independent LVDC buses in order to ensure equal power demand from each MVDC to LVDC DC/DC converters;
wherein the at least one interconnecting DC/DC converter is configured to re-route power between the plurality of independent LVDC buses; and
wherein a power rating of the at least one interconnecting DC/DC converter is set according to power to be rerouted from other LVDC buses via the interconnecting DC/DC converter.

13. The interconnection circuit according to claim 12, wherein one single interconnecting DC/DC converter connects two of the at least two independent LVDC buses to the plurality of MVDC to LVDC DC/DC converters.

14. The interconnection circuit according to claim 12, wherein a power of the at least one interconnecting DC/DC converter is set according to an output power of one of the LVDC buses under full load.

15. The interconnection circuit according to claim 12, wherein no power is provided by other LVDC buses.

16. The interconnection circuit according to claim 12, wherein for each pair of connected LVDC buses, a power of the at least one interconnecting DC/DC converter is set to (P1−P2)/2, wherein P1 is a power corresponding to a load on one of the two LVDC buses, and wherein P2 is a power corresponding to a load on another of the two LVDC buses.

17. The interconnection circuit according to claim 12, wherein each of the LVDC buses is connected to each of the LVDC buses via one interconnecting DC/DC converter, wherein a power rating of each of the interconnecting DC/DC converters is P/n, and wherein n is a number of LVDC buses of the interconnection circuit.

18. The interconnection circuit according to claim 12, wherein another DC/DC converter is connected in series in each connection between the LVDC bus and the interconnecting DC/DC converter.

19. The interconnection circuit according to claim 12, wherein the interconnecting DC/DC converter is one of a bidirectional converter or a bidirectional buck-boost converter or a dual-active bridge or a regulated resonant converter.

20. The interconnection circuit according to claim 12, wherein each MVDC to LVDC DC/DC converters is one of an unregulated resonant converter or a dual-active bridge or a regulated resonant converter.

* * * * *

UNITED STATES PATENT AND TRADEMARK OFFICE
CERTIFICATE OF CORRECTION

| | |
|---|---|
| PATENT NO. | : 11,791,628 B2 |
| APPLICATION NO. | : 17/916473 |
| DATED | : October 17, 2023 |
| INVENTOR(S) | : Gabriel Ignacio Ortiz et al. |

It is certified that error appears in the above-identified patent and that said Letters Patent is hereby corrected as shown below:

In the Specification

In Column 1, Lines 7-10, delete "International Application No. PCT/EP2021/054736, filed on Feb. 25, 2021, which claims priority to European Patent Application No. 20167310.0, filed on Mar. 1, 2020," and insert -- International Application No. PCT/EP2021/058322, filed on Mar. 30, 2021, which claims priority to European Patent Application No. 20166634.4, filed on Mar. 30, 2020, --.

In the Claims

In Column 10, in Claim 13, Line 45, delete "interconnection circuit" and insert -- SST system --.

In Column 10, in Claim 14, Line 49, delete "interconnection circuit" and insert -- SST system --.

In Column 10, in Claim 15, Line 53, delete "interconnection circuit" and insert -- SST system --.

In Column 10, in Claim 16, Line 55, delete "interconnection circuit" and insert -- SST system --.

In Column 10, in Claim 17, Line 61, delete "interconnection circuit" and insert -- SST system --.

In Column 11, in Claim 18, Line 1, delete "interconnection circuit" and insert -- SST system --.

In Column 11, in Claim 19, Line 5, delete "interconnection circuit" and insert -- SST system --.

In Column 11, in Claim 20, Line 10, delete "interconnection circuit" and insert -- SST system --.

Signed and Sealed this
Thirteenth Day of February, 2024

Katherine Kelly Vidal
*Director of the United States Patent and Trademark Office*